United States Patent
Lofgren (10) Patent No.: US 9,382,837 B2
(45) Date of Patent: Jul. 5, 2016

(54) SUPERCHARGING SYSTEM FOR AN INTERNAL COMBUSTION ENGINE

(75) Inventor: Isak Lofgren, Saro (SE)

(73) Assignee: KASI TECHNOLOGIES AB, Smedjebacken (SE)

( * ) Notice: Subject to any disclaimer, the term of this patent is extended or adjusted under 35 U.S.C. 154(b) by 312 days.

(21) Appl. No.: 13/807,438

(22) PCT Filed: Jul. 9, 2010

(86) PCT No.: PCT/EP2010/059889
§ 371 (c)(1),
(2), (4) Date: Dec. 28, 2012

(87) PCT Pub. No.: WO2012/003880
PCT Pub. Date: Jan. 12, 2012

(65) Prior Publication Data
US 2013/0152581 A1    Jun. 20, 2013

(51) Int. Cl.
*F02B 37/00*    (2006.01)
*F02B 39/12*    (2006.01)
*F02B 39/06*    (2006.01)
(Continued)

(52) U.S. Cl.
CPC .............. *F02B 37/00* (2013.01); *F02B 37/105* (2013.01); *F02B 39/06* (2013.01); *F02B 39/10* (2013.01); *F02B 39/12* (2013.01); *F02B 41/10* (2013.01); *F02B 67/06* (2013.01); *F16C 3/03* (2013.01); *F16D 3/50* (2013.01); *F16D 3/68* (2013.01); *F16F 15/1245* (2013.01); *F02B 37/14* (2013.01); *F16C 2360/24* (2013.01); *Y02T 10/144* (2013.01); *Y02T 10/163* (2013.01)

(58) Field of Classification Search
CPC .................................................... F02B 37/105

USPC ............ 60/607–609; 464/154, 158, 159, 182, 464/18; 403/359.1, 359.4
See application file for complete search history.

(56) References Cited

U.S. PATENT DOCUMENTS 3,174,302 A * 3/1965 Pomper ................... F16D 3/185
                                                    464/154
3,667,214 A * 6/1972 Addie ............................ 60/608
(Continued)

FOREIGN PATENT DOCUMENTS

DE        44 29 855            8/1995
DE    102008005201 A1 *    7/2009  ............. F02B 37/00
(Continued)

OTHER PUBLICATIONS

International Search Report dated Mar. 22, 2011, corresponding to PCT/EP2010/059889.

*Primary Examiner* — Thomas Denion
*Assistant Examiner* — Jessica Kebea
(74) *Attorney, Agent, or Firm* — Young & Thompson (57) ABSTRACT

A supercharging system (6) for an internal combustion engine includes a turbo charging device with a turbine (7) and a compressor (8), the compressor having a compressor shaft (8a) coupled to the compressor shaft (8a) and a drive shaft (32); a clutch unit (18); a power transmission for connecting a crank shaft (4) of the combustion engine (1) to the drive shaft (32) via the clutch unit (18); and an electric motor or electric generator (20) connected to the drive shaft (32). The compressor shaft (8a) is at least on one end movably arranged between the compressor (8) and the planetary gear (25) to allow relative movements between the compressor (8) and the planetary gear (25).

14 Claims, 4 Drawing Sheets

(51) Int. Cl.
*F02B 39/10* (2006.01)
*F02B 37/14* (2006.01)
*F02B 41/10* (2006.01)
*F16F 15/124* (2006.01)
*F16C 3/03* (2006.01)
*F02B 67/06* (2006.01)
*F16D 3/50* (2006.01)
*F16D 3/68* (2006.01)
*F02B 37/10* (2006.01)

(56) References Cited

U.S. PATENT DOCUMENTS

| | | | | |
|---|---|---|---|---|
| 3,874,194 | A * | 4/1975 | Filepp et al. | 464/154 |
| 4,004,433 | A * | 1/1977 | Calistrat | 464/16 |
| 4,018,062 | A * | 4/1977 | Bulliot | 464/158 |
| 6,671,475 | B2 * | 12/2003 | Katada | F16D 1/0852 399/111 |
| 7,763,336 | B2 * | 7/2010 | Clarke | C08G 18/10 428/35.7 |
| 7,849,840 | B2 * | 12/2010 | St. James | 123/559.3 |
| 8,262,491 | B2 * | 9/2012 | Burgbacher et al. | 464/183 |
| 8,528,330 | B2 * | 9/2013 | Lofgren | 60/608 |
| 8,528,331 | B2 * | 9/2013 | Lofgren | 60/608 |
| 8,584,459 | B2 * | 11/2013 | Richards | 60/608 |
| 2006/0032225 | A1 * | 2/2006 | Dyne et al. | 60/607 |
| 2008/0149452 | A1 | 6/2008 | Pratley et al. | |
| 2009/0025696 | A1 * | 1/2009 | Lovgren | 123/559.1 |
| 2009/0258717 | A1 * | 10/2009 | Higgins | 464/182 |
| 2010/0199666 | A1 * | 8/2010 | VanDyne et al. | 60/605.2 |
| 2013/0017920 | A1 * | 1/2013 | Sherrill et al. | 475/183 |
| 2013/0269342 | A1 * | 10/2013 | Oh et al. | 60/607 |

FOREIGN PATENT DOCUMENTS

| | | | |
|---|---|---|---|
| GB | 2 354 553 | 3/2001 | |
| GB | 2390871 A * | 1/2004 | F02B 37/04 |
| JP | GB 2264548 A * | 9/1993 | F16D 3/185 |
| JP | 2012092802 A * | 5/2012 | |
| WO | WO 2005124121 A1 * | 12/2005 | |

* cited by examiner

SUPERCHARGING SYSTEM FOR AN INTERNAL COMBUSTION ENGINE

FIELD OF THE INVENTION

The present invention relates to a supercharging system for an internal combustion engine comprising a turbo charging device with a turbine and a compressor, said compressor having a compressor shaft; a planetary gear coupled to said compressor shaft and a drive shaft; a clutch unit; a power transmission for connecting a crank shaft of the combustion engine to said drive shaft via the clutch unit; and an electric motor or electric generator connected to said drive shaft.

TECHNICAL BACKGROUND

It is always a need and a desire for further developments within the automotive industry especially to develop more fuel saving products. To save fuel the engine has to become more effective and this can be done by increasing intake manifold pressure in order to decrease internal pumping losses. It is known that different supercharging devices, which are connected to the engine, may be used to increase intake manifold pressure. For example may mechanical driven superchargers, exhaust driven turbo superchargers or electrical motor driven superchargers be used. It is also known that it is possible to combine all these different propulsion modes into one supercharging device in order to make benefit of the different properties associated with the different propulsion modes.

US2009025696 shows such a supercharging device. The supercharging device is for an internal combustion engine incorporating in combination, a turbine, a compressor and an electrical driven system that is connected by any power transmission system to the crankshaft or any other vehicle drive shaft of an internal combustion engine and which are arranged along a common axis, where the turbine inlet is subjected to exhaust gases, causing the turbine wheel to rotate and thereby via the drive shaft causing mechanical rotating power.

It has been noticed that the system is sensitive to vibrations, which may cause damages and fractures. Hence, there is a need to further develop this system.

SUMMARY OF THE INVENTION

The object of the present invention is to provide a supercharger that overcomes the above issue.

The invention is based on the insight that when parts moves relative each other, connection parts and/or the connection itself may break.

The invention relates to a supercharging system for an internal combustion engine comprising a turbo charging device with a turbine and a compressor, said compressor having a compressor shaft; a planetary gear coupled to said compressor shaft and a drive shaft; a clutch unit; a power transmission for connecting a crank shaft of the combustion engine to said drive shaft via the clutch unit; and an electric motor or electric generator connected to said drive shaft. Said compressor shaft comprises a shaft and at least one end connector, and said end connector comprises a shaft receiving part which is movably arranged to said shaft to allow relative movements between said compressor and said planetary gear in a radial direction and/or axial direction in relation to an axis of said compressor or an axis of said planetary gear connecting said compressor shaft. The compressor may be arranged on or otherwise being connected to the compressor shaft.

By having a compressor shaft, which can react to movements caused by relative movement by the two parts connecting the compressor shaft, the compressor shaft is less exposed to forces which might cause the shaft to break. Both the compressor and the planetary gear rotate and this rotation may cause each part to move, especially at high rates of rotation. They may move relative each other. If the compressor shaft is fixed arranged between the compressor and the planetary gear and they start move relative each other, the compressor shaft may break if the forces are too high. This will cause system failure, i.e. the supercharging system will not work.

By having the compressor shaft also arranged to take up axial movements the shaft will work in all temperatures. Linear expansion of the materials does not have to be considered. Further, relative movements in the axial direction can be taken up. The axial direction is the direction which is parallel to an axis of said compressor or an axis of said planetary gear connecting said compressor shaft.

Said compressor shaft comprises a shaft and at least one end connector, and said end connector comprises a shaft receiving part, which is movably arranged to said shaft. This is a simple way to make a compressor shaft which may take up both relative movements in the radial direction and/or in the axial direction. The features accomplishing this may be integrated in the shaft and its corresponding end connector. Hence, standard compressors and standard planetary gears may be used without amending them in order to receive the desired function.

According to at least one exemplary embodiment said shaft receiving part is arranged into a hole in one end of said shaft. The hole may be a hole which extends through the whole shaft or just a blind hole.

According to at least one exemplary embodiment said hole has an irregularly shaped cross-section and said shaft receiving part has a mutually matching irregularly shaped cross-section. If both parts have corresponding cross-sections, which fits into each other, rotation from the compressor can be transmitted over the shaft to the planetary gear in an easy way and the other way around.

According to at least one exemplary embodiment said hole has a polygonal cross-section and said shaft receiving part has a mutually matching polygonal cross-section. If both parts have corresponding polygonal cross-sections, which fits into each other, rotation from the compressor can be transmitted over the shaft to the planetary gear in an easy way and the other way around.

According to at least one exemplary embodiment said shaft receiving part is tapering. By having the shaft receiving part tapered, space is created at that position when it is placed in the hole in the shaft. If the tapering is all around the shaft receiving part and the shaft has a straight hole, into which the tapered shaft receiving part is fitted the shaft is allowed to tilt around the tapered shaft receiving part. This way the compressor shaft can move and take up the relative movements between the compressor and the planetary gear. The tapering may for example be $2°±1°$.

According to at least one exemplary embodiment said end connector connects said shaft to said compressor and said shaft is on the other end connected to a shaft of said planetary gear, which shaft transmits power from said planetary gear to said turbo charging device or from said turbo charging device to said planetary gear.

According to at least one exemplary embodiment said shaft is part of said shaft of said planetary gear and is rotationally stored in said planetary gear. The advantage is that less movable parts may be needed and that the housing of the turbo charging device may not be necessary. The shaft of the planetary gear may be carried in a bearing in the planetary gear.

According to at least one exemplary embodiment said end connector connects said shaft to said planetary gear and said shaft is on the other end connected to said compressor. The advantage is that fewer parts may be needed.

According to at least one exemplary embodiment said end connector connects said shaft to said planetary gear and a second end connector connects said shaft said compressor. The advantage is that the radial play gets larger between the parts. By integrating the connection between the compressor shaft and the compressor or the planetary gear into the end connector no extra parts are needed. For example the end connector may have a threaded hole on the opposite end from where the shaft is arranged. The end connector part may then be screwed onto a threaded axis on the compressor or the planetary gear or be fixed by a cotter.

According to at least one exemplary embodiment said end connector has at least one opening through which oil is introduced into the shaft in order to lubricate the compressor shaft in its shaft/end connector connection. This is an easy way to lubricate the system.

According to at least one exemplary embodiment said drive shaft is a two part drive shaft, wherein said two parts of said drive shaft are connected to each other via a flexible clutch element. This way the two shafts may be separated from each other.

According to at least one exemplary embodiment said flexible clutch element is of an electrically isolating material. This will avoid short circuit between the parts.

According to at least one exemplary embodiment said flexible clutch element is of a damping material and will work as a damper between the two pairs. The damping material and the electrically isolating material may for example be rubber.

According to at least one exemplary embodiment between said compressor and said planetary gear and at least partly around said compressor shaft is an air intake housing arranged, wherein said air intake housing comprises at least one air inlet opening. This housing distributes air to the compressor. It acts as a construction element merging the planetary gear housing together with the compressor housing. The intake housing may be integrated to be a part of either the planetary housing or the compressor housing According to at least one exemplary embodiment said air providing part is a disc comprising at least one air guiding protrusion circumferential arranged around said disc establishing said air inlet opening. This is an easy way to manufacture the housing as a separate unit. However, the function of the housing may be incorporated into either the compressor or the planetary gear.

According to at least one exemplary embodiment said compressor shaft is further supported by a bearing arranged between said compressor and said planetary gear.

According to at least one exemplary embodiment said bearing is part of said intake housing.

According to at least one exemplary embodiment said end connector comprises a protrusion having a ball shaped end which is protruding from said shaft receiving part in the longitudinal direction of said compressor shaft. According to at least one exemplary embodiment said ball shaped end comprises at least one opening through which oil is introduced into the shaft in order to lubricate the compressor shaft in its shaft/end connector connection. The ball shaped protrusion may be a ball joint, and it may work as a positioner for the end connector when it is positioned into the shaft of the connector shaft, i.e. that the end connector is centered to the shaft of the connector shaft.

According to at least one exemplary embodiment a supercharging system for an internal combustion engine comprising a turbo charging device with a turbine and a compressor, said compressor having a compressor shaft; a planetary gear coupled to said compressor shaft and a drive shaft; a clutch unit; a power transmission for connecting a crank shaft of the combustion engine to said drive shaft via the clutch unit; and an electric motor or electric generator connected to said drive shaft, wherein said compressor shaft comprises a shaft and at least one end connector, and said end connector comprises a shaft receiving part, which is movably arranged to said shaft.

According to at least one exemplary embodiment said end connector connects said compressor shaft to said compressor and/or said planetary gear. By integrating the connection between the compressor shaft and the compressor or planetary gear into the end connector no extra parts are needed. For example the end connector may have a threaded hole on the opposite side from where the shaft is arranged. The end connector part may then be screwed onto a threaded axis on the compressor or the planetary gear.

According to at least one exemplary embodiment said shaft receiving part is arranged into a hole in said shaft.

According to at least one exemplary embodiment said hole has a polygonal cross-section and said shaft or shaft receiving part has a mutually matching polygonal cross-section. If both parts have corresponding polygonal cross-sections, which fits into each other, rotation from the compressor can be transmitted over the shaft to the planetary gear in an easy way and the other way around.

According to at least one exemplary embodiment said shaft receiving part is tapering. By having the shaft receiving part tapered, space is created at that position. If the tapering is all around the shaft receiving part and the shaft has a straight hole, into which the tapered shaft receiving part is fitted the shaft is allowed to tilt around the tapered shaft receiving part. This way the compressor shaft can move and take up the relative movements between the compressor and the planetary gear. The tapering may for example be 2°±1.

According to at least one exemplary embodiment a supercharging system for an internal combustion engine comprising a turbo charging device with a turbine and a compressor, said compressor having a compressor shaft; a planetary gear coupled to said compressor shaft and a drive shaft; a clutch unit; a power transmission for connecting a crank shaft of the combustion engine to said drive shaft via the clutch unit; and an electric motor or electric generator connected to said drive shaft, wherein said drive shaft is a two part drive shaft, wherein said two parts are connected to each other and in said connection is a flexible clutch element arranged. This way the two shafts may be separated from each other and/or mechanically damped.

According to at least one exemplary embodiment said connection is a claw connection comprising mutually matching means.

According to at least one exemplary embodiment said flexible clutch element has shape which follows the mutually matching means of the claw connection.

According to at least one exemplary embodiment said flexible clutch element is made of an electrically isolating material.

According to at least one exemplary embodiment said flexible clutch element is made of a damping material. The damping material and the isolation material may for example be rubber.

According to at least one exemplary embodiment a supercharging system for an internal combustion engine comprising a turbo charging device with a turbine and a compressor, said compressor being having a compressor shaft; a planetary gear coupled to said compressor shaft and a drive shaft; a clutch unit; a power transmission for connecting a crank shaft of the combustion engine to said drive shaft via the clutch unit; and an electric motor or electric generator connected to said drive shaft, wherein between said compressor and said planetary gear and at least partly around said compressor shaft is an air intake housing arranged, wherein said air intake housing comprises at least one air inlet opening. This housing distributes air to the compressor. It acts as a construction element merging the planetary gear housing together with the compressor housing. The intake housing may be integrated to be a part of either the planetary housing or the compressor housing According to at least one exemplary embodiment said air providing part is a disc comprising at least one air guiding protrusion circumferential arranged around said disc establishing said air inlet opening. This is an easy way to manufacture the housing as a separate unit. However, the function of the housing may be incorporated into either the compressor or the planetary gear.

According to at least one exemplary embodiment said compressor shaft is further supported by a bearing, and said bearing is part of said intake housing.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. Other objectives, features and advantages of the present invention will appear from the following detailed disclosure, as well as from the drawings.

BRIEF DESCRIPTION OF THE DRAWINGS

The above, as well as additional objects, features and advantages of the present invention, will be better understood through the following illustrative and non-limiting detailed description of exemplary embodiments of the present invention, with reference to the appended drawings, where the same reference numerals will be used for similar elements, wherein.

DETAILED DESCRIPTION OF EXEMPLARY EMBODIMENTS

An embodiment of the invention will be described in more detail in the following with reference to the accompanying drawings.

Figure 1:
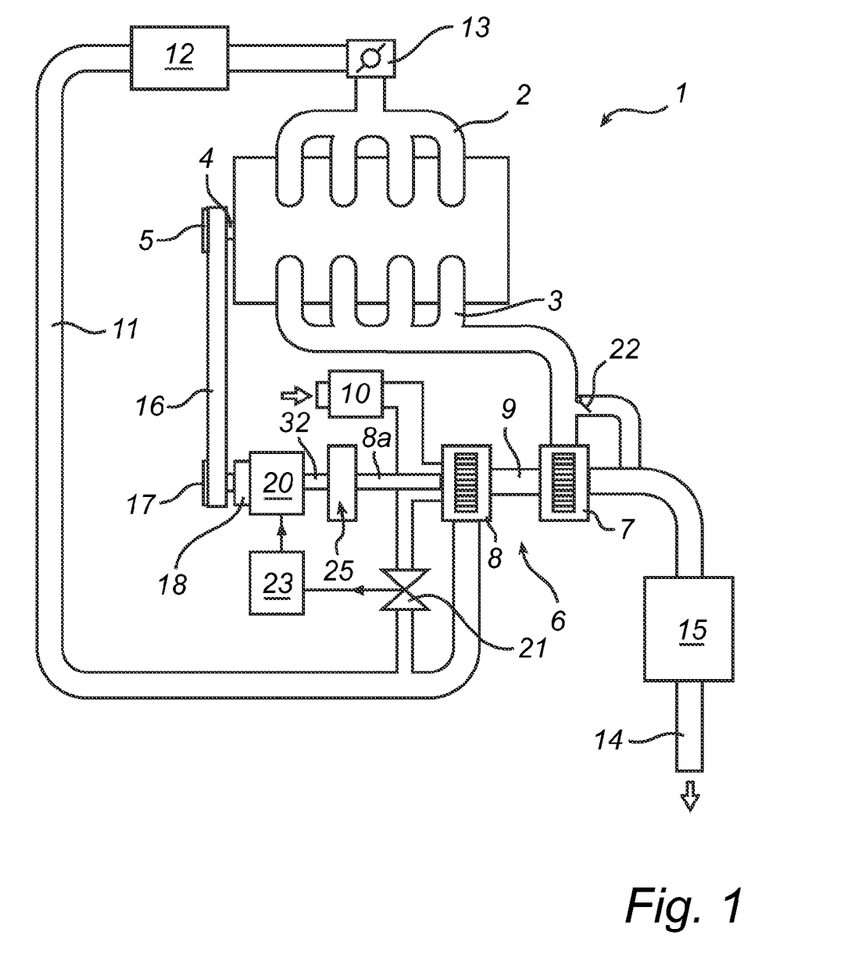
FIG. 1 is a schematical side view of an internal combustion engine equipped with a supercharging system.

FIG. 1 shows an internal combustion engine 1 having an air intake manifold 2 with four air intake pipes, intimating that the engine has four cylinders. However, the number of cylinders can be higher as well as lower. The internal combustion engine 1 further has an exhaust gas manifold 3, having four exhaust gas pipes for the four cylinders of the engine.

Attached to the engine block is a supercharging system 6 comprising a turbo charging device comprising a turbine 7 and a compressor 8 arranged on a common shaft 9 in such a way that when the turbine rotates the compressor rotates simultaneously. The compressor 8 is connected to an compressor-connected shaft 8a projecting in the opposite direction to the common turbine/compressor shaft 9. The turbine is driven by the exhaust gases from the exhaust gas manifold 3, and an impeller (not shown) of the co-rotating compressor 8 is compressing ambient air which is sucked in via an air filter 10. The compressed air is lead through a duct 11 via an intercooler 12 and a throttle 13 into the internal combustion engine 1 through the air intake manifold 2, whereas the exhaust gases after having passed the turbine are evacuated via an exhaust gas conduit 14 with a catalyzer 15.

The engine 1 has a crankshaft 4 which protrudes outside the engine and is equipped with a pulley 5. The pulley 5 is rotating with the crankshaft 4 of the engine and transfers via a belt drive 16 rotation to a shaft 17, which via a one way clutch 18 is coupled to an electric machine 20, which in turn is coupled through a shaft 32 to a ring gear wheel (not shown) of a planetary gear 25 with planet gear wheels (not shown) and a sun gear wheel (not shown) connected to the compressor shaft 8a. In this manner the rotation of the crank shaft 4 can be transferred to the shaft 9, which is the common shaft for the turbine 7 and the compressor 8, in situations where the turbine has not reached its working area. The belt drive described is not limited to be a belt drive, any type of appropriate transmission units can be used. The clutch unit mentioned can be mechanical one way clutches of any appropriate type, although electric clutches, viscous couplings and the like are also possible.

The engine also incorporates an engine brake valve 21 and a wastegate 22. The brake valve 21 is controlled by way of a control box 23, which based on different engine behaviour parameters, will operate for maintaining the rotational speed of the turbine so high as possible in order to avoid dangerous pressure increase at the exhaust side.

Figures 2A, 2B:
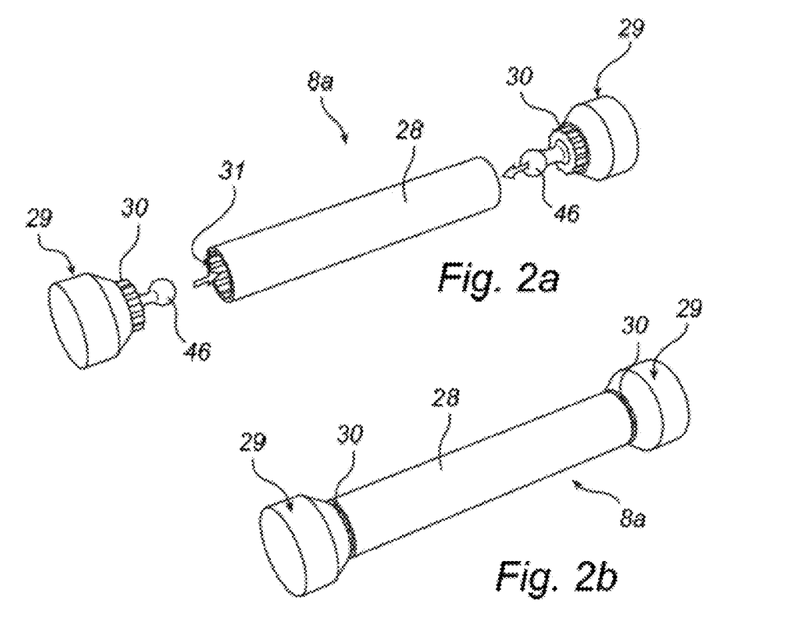
FIG. 2a-2c show the compressor shaft in FIG. 1 in an exploded view (2a), in a connected view (2b) and a cross-section view (2c) according to the invention.

FIG. 2a shows the compressor-connected shaft 8a, which is arranged between the compressor 8 and the planetary gear 25 in FIG. 1. The compressor-connected shaft 8a comprises a shaft portion 28, which here is exemplified as a hollow shaft portion 28, and on each end is an end connection 29 arranged, which is loosely arranged into the hollow shaft portion 28. The end connection 29 comprises a shaft receiving part 30 and on the opposite end the end connection 29 has connecting features (not shown) which allow the end connection 29 to be fixed to the compressor or to the planetary gear. The connecting features may be a threaded shaft on the compressor 8 or on the planetary gear 25 to which the end connection 29 is screwed onto or it may be connected by a cotter. As an alternative, the end connection 29 may be integrated in the axis/shaft of the compressor 8 or of the planetary gear 25, which may protrude out of the compressor 8 or the planetary gear 25 to transmit rotation from one part to the other. On the end of the end connection 29, where the shaft receiving part 30 is arranged, is a protrusion having a ball shaped at its end i.e. a ball shaped protrusion 46 which centralise the end connection 29 to the shaft portion 28. The protrusion 46 is protruding from said shaft receiving part 30 in the longitudinal direction, i.e. in the direction of the axis of said compressor-connected shaft 8a.

FIG. 2b shows the shaft portion 28 and the end connection 29 connected to each other.

Figure 2C:
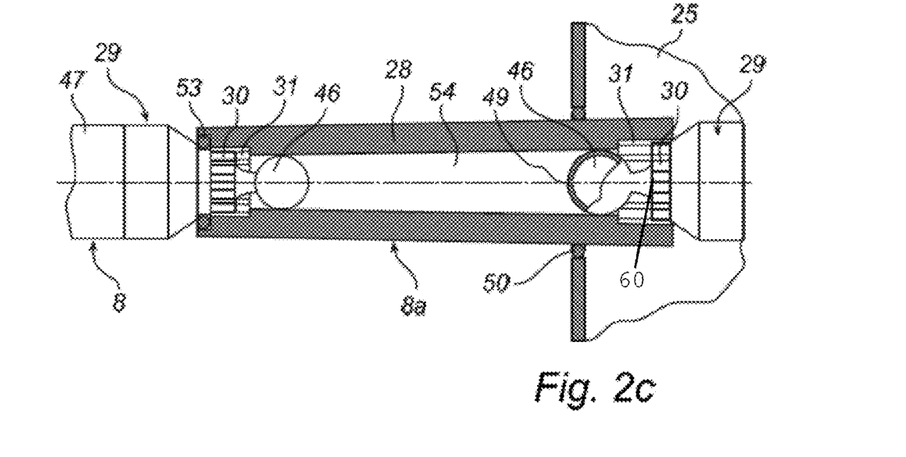

FIG. 2c shows the compressor-connected shaft 8a with its hollow shaft portion 28 and how the ball shaped protrusions 46 and the shaft receiving parts 30 of the end connectors 29 are fitted into the hollow shaft portion 28. On one side is the end connector 29 connected to the compressor 8 and the other end to the planetary gear 25. On the planetary gear side is an oil gasket 50 arranged, which seals the planetary gears outgoing shaft. On the compressor 8 side, the end connector 29 is arranged to an internal shaft 47 inside the compressor 8. The ball shaped protrusion 46 has on the planetary side 25 at least one opening 60 through which oil may be introduced into the hollow shaft portion 28 via the end connector 29 in order to lubricate the compressor shaft in its shaft/end connector connection. This opening may have or work as a spraying nozzle. An oil gasket 53 is also provided around the end connector 29 on the compressor side in order to seal the hollow shaft portion 28. The opening/hole 31 (see FIG. 2a) in the shaft portion has a polygonal cross-section. The shaft receiving part 30 of the end connector 29 has a mutually matching polygonal shape which fits into the hole 31 of the shaft 29 in order to be able to transfer the rotation of the planetary gear 25 to the compressor 8. However, the shaft receiving part 30 is tapering in the direction towards the shaft portion 28 (see FIG. 2a). This allows the shaft to move/tilt during use when the compressor-connected shaft 8a is arranged between the compressor 8 and the planetary gear 25, in case of relative movements. This will prevent that the compressor-connected shaft 8a breaks during use. The ball shaped protrusion 46 is so designed that it allows the shaft portion 28 to move on the shaft receiving part 30 of the end connector 29. The polygonal cross-section shape extends only a distance of the shaft on both ends, i.e. where the shaft receiving part 30 of the end connector 29 shall be arranged. Preferably it is a longer than the extension of the shaft receiving part 30, so that the shaft portion 28 and the shaft receiving part 30 may move in an axial direction to each other. Between the two ends having this cross-section is a smaller hole 54 connecting these two ends, which inner wall has an inclination. This inclination allows the oil which is introduced into the shaft to come out of the shaft portion 28 through the connection shaft/shaft receiving part on the planetary gear 25 side. However, the shaft portion 28 is not limited to the following shape, the irregular cross-section may extend throughout the whole shaft and the ball shaped protrusion 46 may have a similar cross-section as long as it still have a ball shape allowing the shaft to move around it.

The compressor-connected shaft 8a is not limited to have a movable end connection 29 on both ends. It may for example only have one on the side connecting the compressor 8 or one on the side connecting the planetary gear 25.

For example, the end connector 29 may connect the shaft portion 28 to the compressor 8 and said shaft portion 28 may on the other end be connected to a shaft of said planetary gear, which shaft transmits power from said planetary gear to said turbo charging device or from said turbo charging device to said planetary gear. Alternative, the end connector 29 may connect the shaft portion 28 to the planetary gear 25 and the shaft portion 28 may on the other end be connected to the compressor 8. Another alternative may be that the end connector 29 connects the shaft portion 28 to the planetary gear 25 and a second end connector 29 connects the other end of the shaft portion 28 to the compressor. The cross-section of the hollow the shaft and the mutually matching end connector is not limited to be a polygonal cross-section, it may take any irregular shape which allows rotation to be transmitted from one part to the other. The transmission of the rotation may also be integrated to the ball shaped protrusion as long as the "ball" is allowed to rotate inside the hollow shaft.

As an alternative to a hollow shaft, a rod may be used, where on each side or only on one side a hole with a polygonal or an irregular shaped cross-section is shaped into the end of the rod, in order to fit the shaft receiving part.

As an alternative to a hollow shaft or a rod with an internal hole/recess on one end or on both ends, the shaft/rod may on the outside, on its ends or over the whole length, has a polygonal cross-section, i.e. the shaft/rod may have a polygon cross-section. The shaft connection part may then have an internal mutually matching shape, i.e. a hole which fits over the shaft/rod. The shaft may then on the end where the shaft receiving part shall be arranged be tapering or as an alternative the hole in the shaft connecting part may be conical, with a larger opening than the cross-section at the other end in order to get the same effect.

Figure 3:
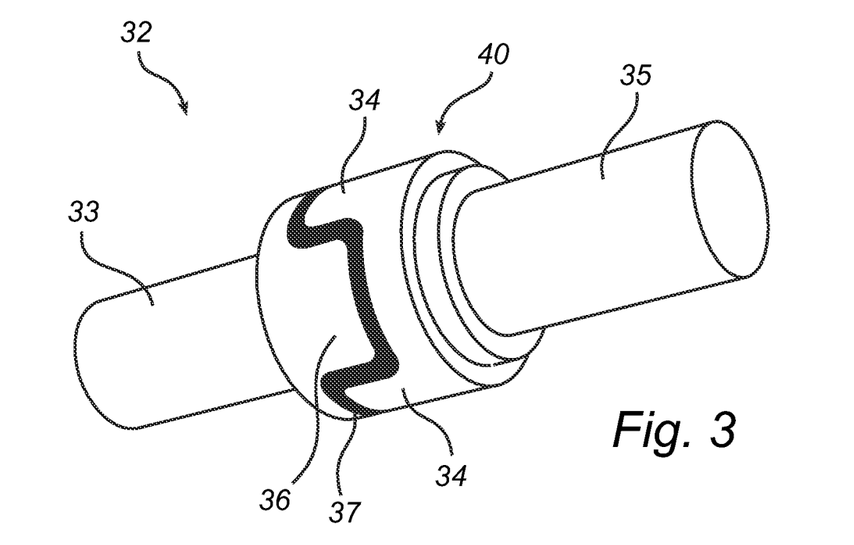
FIG. 3 shows the shaft between the planet gear and the electric machine in FIG. 1

FIG. 3 shows the shaft 32 between the electric machine 20 and the planetary gear 25 in FIG. 1 (not shown in FIG. 3). The shaft 32 is a two part shaft 33, 35 connected together by a claw connection 40, which transfers rotation from one shaft to the other shaft. The first part 35 of the shaft 32, for example the one connected to the planetary gear is shaped as a fork with two protruding portions 34 with a distance between them. The two protruding portions 34 are here parallel to each other, however this is not necessary. The second part 33 of the shaft 32 has a mutually matching protrusion 36 which fits between the two protruding portions 34. Between the parts 33, 35, i.e. where they connect is a flexible clutch element 37 arranged. The flexible clutch element 37 is of an electrically isolating material and of a damping material, for example rubber, which works as an electric isolating coupling and as a mechanical damper between the parts. Preferably, the corners in the connection are rounded in order to prevent sharp corners which may break the flexible clutch element 37.

Figure 4:
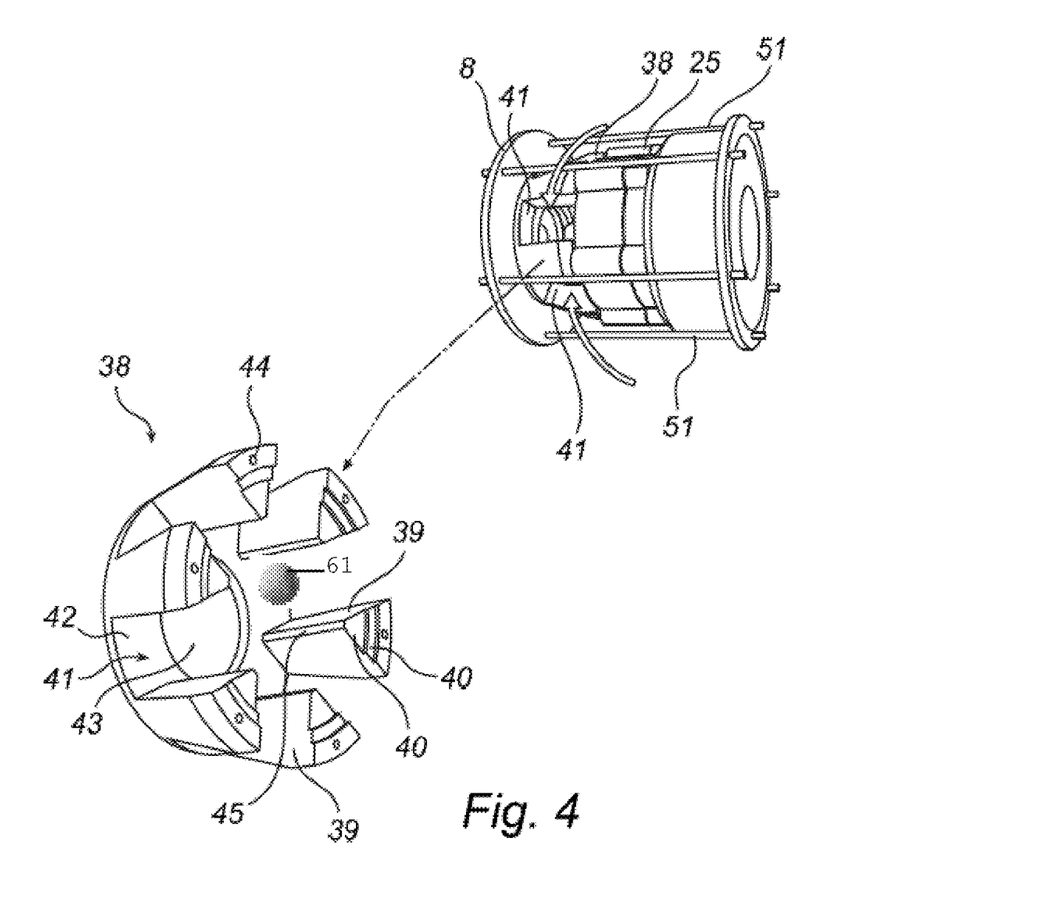
FIG. 4 shows the compressor and the planetary gear with an air intake housing.

FIG. 4a shows an air intake housing 38 arranged between the compressor 8 and the planetary gear 25 and around said compressor shaft (not shown). The air intake housing 38 comprises a plurality of air inlet openings 41 distributed circumferential around the rotational axis of the compressor shaft. The air intake housing 39 is not limited to have several inlet openings 41, it may be only one. The air intake housing 38 is here exemplified as connected to the planetary gear by screws (not shown) and pressed between the planetary gear 25 and the compressor 8 by externally arranged screw joint connections 51 between the compressor 8 and planetary gear 25. The air intake housing 38 is not limited to be a separate part, it may also be integrated in the compressor or in the planetary gear.

The air intake housing 38, is shaped as a circular disc 42 with a hole 43 through which the compressor shaft 8a (in FIG. 1) protrudes through. Protrusions 39 are evenly distributed circumferentially around the disc 42. The protrusions 39 are shaped as a piece of cake, i.e. they have a triangular shape. Where one corner 45 is directed towards the centre of the disc, however they do not extend to the hole. This allows the air to flow and circulate around compression shaft before it enters the compressor. The air gets a swirling movement. Between the protrusions 39 on the disc are spaces, i.e. inlet openings 41 provided, which allows air to be drawn into the compressor 8 to be compressed. The compressed air is as described in FIG. 1 lead through a duct 11 into the internal combustion engine. Two steps 40 are formed into the top of the protrusions to center the intake housing relative the central axis. Each protrusion has a through hole 44 which allows a screw to be arranged into the hole 44 and fix the air intake housing 38 to the planetary gear.

The air intake housing 38 and its triangular shaped protrusion are not limited to this design, it may take any shape suitable for the application. The air intake housing 38 may comprise a bearing 61 to support the compressor shaft. The bearing 61 may be used when for example the end connector 29 connects the shaft portion 28 to the compressor 8 and said shaft portion 28 is on the other end connected to a shaft 35 of said planetary gear, which shaft transmits power from said planetary gear to said turbo charging device or from said turbo charging device to said planetary gear. Alternative, the end connector 29 may connect the shaft portion 28 to the planetary gear 25 and the shaft portion 28 may on the other end be connected to the compressor 8. Another alternative may be that the end connector 29 connects the shaft portion 28 to the planetary gear 25 and a second end connector 29 connects the other end of the shaft portion 28 to the compressor. In the two first mentioned examples the compressor-connected shaft 8*a* is movably arranged on one side. In the last example both ends are movably arranged.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A supercharging system for an internal combustion engine, the supercharging system comprising:
   a turbo charging device with a turbine and a compressor having a compressor-connected shaft;
   a planetary gear transmission coupled to said compressor-connected shaft and a drive shaft;
   a clutch unit;
   a power transmission configured to connect a crank shaft of the combustion engine to said drive shaft through a connection of the power transmission to the clutch unit; and
   an electric motor or electric generator connected to said drive shaft,
   wherein said compressor-connected shaft comprises a shaft portion and at least one end connector, and said at least one end connector comprises a shaft receiving part which is movably connected with said shaft portion to allow relative movements between said compressor and said planetary gear transmission in one or more of a radial direction and axial direction in relation to one or more of an axis of said compressor and an axis of said planetary gear transmission.

2. The supercharging system according to claim 1, wherein said shaft receiving part is fit into a hole in said shaft portion.

3. The supercharging system according to claim 2, wherein said hole has a non-uniform inner circumferential shape and said shaft receiving part has a mutually matching non-uniform outer circumferential shape where the shaft receiving part is fit into the hole in the shaft portion.

4. The supercharging system according to claim 2, wherein said hole has a polygonal shape and said shaft receiving part has a mutually matching polygonal shape where the shaft receiving part is fit into the hole in the shaft portion.

5. The supercharging system according to claim 1, wherein said shaft receiving part is tapered.

6. The supercharging system according to claim 1, wherein said at least one end connector connects said compressor-connected shaft to said planetary gear transmission at a first end and said compressor-connected shaft is connected to said compressor at a second end.

7. The supercharging system according to claim 1, wherein said at least one end connector connects said shaft portion to said planetary gear transmission and a second end connector connects said shaft portion to said compressor.

8. The supercharging system according to claim 1, wherein said at least one end connector has a protrusion that includes at least one opening through which oil is introduced into the shaft in order to lubricate the compressor-connected shaft in its shaft/end connector connection.

9. The supercharging system according to claim 1, wherein said drive shaft is a two-part drive shaft, said two parts of said drive shaft being connected to each other via a flexible clutch element.

10. The supercharging system according to claim 9, wherein said flexible clutch element is of an electrically isolating material.

11. The supercharging system according to claim 9, wherein said flexible clutch element is of a damping material.

12. The supercharging system according to claim 2, wherein said shaft receiving part is tapered.

13. The supercharging system according to claim 3, wherein said shaft receiving part is tapered.

14. The supercharging system according to claim 4, wherein said shaft receiving part is tapered.

* * * * *